Oct. 1, 1963
S. G. HUGHES
3,105,385
PLASMA ACCELEROMETER
Filed Oct. 10, 1960
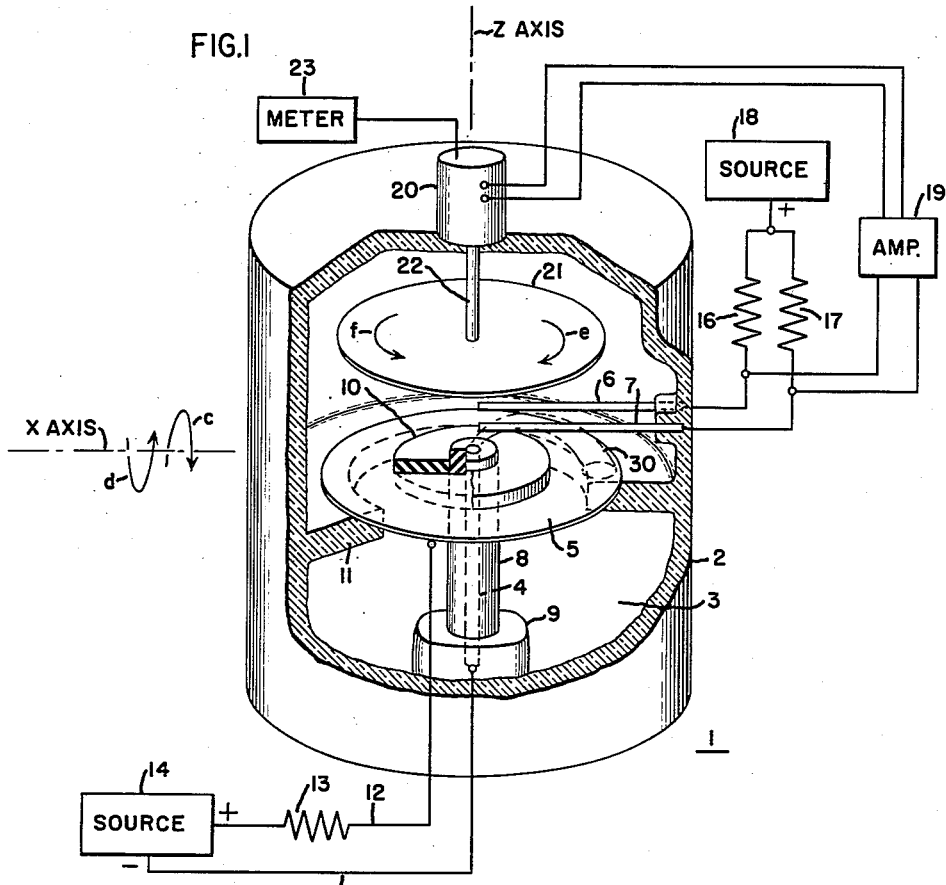
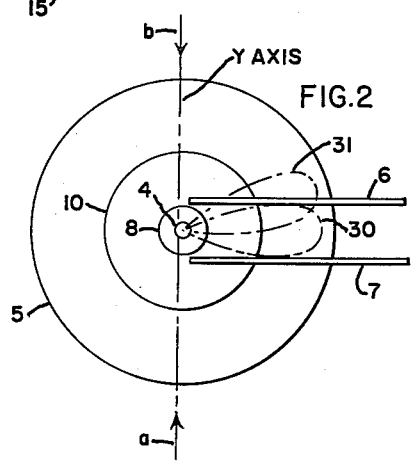
INVENTOR:
STANLEY G. HUGHES,
BY *Marvin Greenberg*
HIS ATTORNEY.

United States Patent Office 3,105,385
Patented Oct. 1, 1963

3,105,385
PLASMA ACCELEROMETER
Stanley G. Hughes, Devon, Pa., assignor to General Electric Company, a corporation of New York
Filed Oct. 10, 1960, Ser. No. 61,465
8 Claims. (Cl. 73—516)

The present invention relates to a novel device that is responsive to acceleration forces and more particularly to a novel plasma electron device which may be employed in an electrical circuit as an accelerometer, velocimeter or inclinometer.

Acceleration responsive devices, as known in the prior art, conventionally employ a seismic mass in combination with a spring and damper means, and are normally subject to frictional forces, either of the static or dynamic type, or both, which impair their reliability and sensitivity. To reduce these adverse characteristics normally requires an expensive and delicately constructed device.

Accordingly, one object of the invention is to provide a novel acceleration responsive device which is reliable, rugged and inexpensive to manufacture.

It is a further object of the invention to provide a novel acceleration responsive device, the seismic mass of which is essentially free of static and dynamic frictional forces.

It is another object of the invention to provide a novel plasma electron device in which the ion flow between electrodes functions as a seismic mass and which may be employed as a relatively frictionless and rugged accelerometer, velocimeter or inclinometer.

It is still another object of the invention to provide a novel plasma electron device which may be employed as a relatively frictionless accelerometer, or comparable device, responsive to acceleration force components along a single axis and insensitive to other acceleration force components.

These and other objects of the invention are accomplished in an electrical sensing circuit employing a plasma electron device responsive to linear acceleration forces applied in a predetermined direction, which comprises a hermetically sealed envelope filled with a plasma or fluid and containing a cathode electrode having a restricted emissive area and a flat plate anode electrode symmetrically displaced therefrom. Said electrodes are electrically energized so that in the absence of said acceleration forces, there is produced a flow of electrical charges or ions, between said cathode and a concentrated area on the anode surface along a relatively narrow path oriented in a given direction. Said path is found to shift from said given direction in response to said acceleration forces. One explanation for this phenomenon of the charge path shifting in response to the application of acceleration forces is that said forces cause a density gradient in the enclosed fluid, which in combination with the heating of the fluid, primarily at the emissive area of the cathode, produces a component of convection flow in the fluid. The convection flow assumes closed paths away from the source of heat towards the region of low density and return through the unheated and high density region. Convection flow in this manner acts as a force upon said charges to shift their path towards the less dense region. Detector means comprising a pair of elongated detector electrodes are mounted in a plane parallel to said anode and normally symmetrically positioned with respect to said path when in the initial given direction, so that conduction from the cathode to each of said detector electrodes is equal in the absence of said acceleration forces. With said acceleration forces applied, the detector electrodes become unsymmetrically positioned with respect to the shifted path and an unequal conduction to the detector electrodes results. A difference signal may thus be obtained across said detector electrodes that provides an indication of the presence of said acceleration forces.

In accordance with a further aspect of the invention, the direction and magnitude of the applied linear acceleration forces are measured by a feedback mechanism which employs the difference signal to rotate a disc that is mounted within the envelope in a plane parallel to the anode. The disc produces a fluid flow in the region of the detector electrodes proportional to and in a direction opposed to the fluid flow caused by said acceleration forces. Thus, the orientation of the charge path is stabilized so that the said signal is maintained linearly related to the applied acceleration forces. The rotational speed of the disc, which is determined by said signal, is employed to provide a measure of the acceleration. The number of rotations of the disc provides a measure of the velocity.

The invention will be better understood from the following description taken in connection with the accompanying drawings while the novel and distinct features of the invention are particularly pointed out in the appended claims.

FIGURE 1 illustrates a perspective view of one embodiment of applicant's invention which may be employed to measure applied acceleration forces, having a portion of the envelope of the plasma electron device broken away to show the details of the enclosed structure; and FIGURE 2 illustrates a plan view of the anode, cathode and detector electrodes of the plasma device of FIGURE 1 as they appear when mounted in said device.

Referring now to FIGURES 1 and 2, there is illustrated a schematic diagram of one embodiment of applicant's accelerating responsive circuit which may be employed as a linear accelerometer or velocimeter. The circuit comprises a plasma electron device 1 wherein the direction of electron or ion flow is responsive to acceleration forces applied to the device in either of two directions, e.g., indicated by the arrows $a$ and $b$ along the Y axis in FIGURE 2, and accordingly, when placed in a gravitational field, the device is also responsive to inclination around an axis X in the plane of the paper, e.g., indicated by the arrows $c$ and $d$ in FIGURE 1. Thus, the responsive direction may be thought of as parallel to the Y axis for applied acceleration forces, and as around the X axis for applied inclinations. The electron device 1 comprises an enclosed hermetically sealed envelope 2 filled with a plasma medium 3, which is preferably an inert gaseous material, but which may also be a liquid. Within the envelope 2, typically of glass, is the electrode assembly which includes a rod-shaped cold cathode 4, a flat annular or disc shaped anode 5, and detector elements comprising a pair of elongated wire detector electrodes 6 and 7. The cathode 4, constructed of a suitable emissive material, such as tungsten, is surrounded by an insulating sleeve 8 to confine the electron emission to the cathode tip, and is supported parallel to the longitudinal axis Z of the device 1 by boss 9. The disc anode 5, which may be a rhodium plated nickel material, is preferably positioned in a plane orthogonal to the cathode 4, and is supported by the shoulder 11. Anode 5 has a central aperture through which the upper portion of the cathode 4 projects. An insulating disc 10 fits around the projecting portion of the cathode and is secured to the upper surface of the anode so that the path of ion flow extends from a restricted area of the cathode tip to the outer portion of the anode 5.

The plasma medium 3 is preferably a gaseous mixture of approximately 95% argon and 5% nitrogen which at suitable pressures, around 200 millimeters of mercury, will produce a concentrated glow or ionic discharge along path 30, as shown in FIGURES 1 and 2. The detector electrodes 6 and 7, which are electrical conductors, typically of copper, are positioned slightly above the cathode tip in a plane parallel to the plane of the anode 5 and straddling the discharge path 30, as illustrated in FIGURE 2. With the detector electrodes positioned in this manner, conduction to these electrodes from the cathode 4 is equal in the absence of an applied accelerating force, or an equivalent tilt in a gravitational field. In the presence of accelerating forces or an equivalent tilt applied in the responsive direction, conduction to the detector electrodes becomes unequal due to a resulting shift in the discharge path towards one or the other of the detector electrodes, thereby providing an output response, as will become clear presently.

The anode 5 is energized by conductor 12 which connects through current limiting resistor 13 to the positive terminal of voltage source 14, the negative terminal of source 14 being connected by conductor 15 to the cathode 4. For the gas atmosphere being considered, source 14 is preferably a direct voltage of approximately 1000 volts, although an A.-C. source may be employed. Resistor 13 is in the order of 100,000 ohms. Detector electrodes 6 and 7 are respectively connected through load resistors 16 and 17 to voltage source 18, preferably a direct voltage of about 10 volts. Source 18 is for the purpose of cancelling out any space charge tending to form around the detector electrodes, thereby facilitating conduction to these electrodes. Load resistors in the order of 10,000 ohms are typical for deriving useful voltages at the detector electrodes. The detector electrodes 6 and 7 are each connected to a difference amplifier circuit 19, which provides at its output terminals a signal in accordance with the difference of the detector electrode voltages.

The amplifier output is connected to control the speed and direction of rotation of servo motor 20, mounted on the outside of the vessel 2. By way of example, the amplifier circuit 19 may include a ring bridge modulator, for converting the D.-C. voltage at the detector electrodes to A.-C. and an A.-C. amplifier, such as a Norden transistorized servo amplifier, type TS–A4–200A. The motor may be a two phase Norden Servo Motor, type 008E2C. Motor 20 drives disc 21 by means of shaft 22, disc 21 being located within the envelope 2, parallel to and slightly above the plane of the detector electrodes. The motor 20, its energizing circuit and the disc 21 provide a balancing or feedback function. Shaft 22 is hermetically sealed by an O ring in conventional fashion. In accordance with the difference signal obtained from the detector electrodes, the disc is driven in either of two directions at the required speed to counterbalance the effect of the accelerating forces and stabilize the position of the discharge path. A tachometer 23 is connected to determine the rotational speed of the motor 20, which will be seen to be linearly related to the applied acceleration force.

In the operation of applicant's circuit when employed as a linear accelerometer, with no component of acceleration forces in the responsive direction, the detector electrodes 6 and 7 will be symmetrically positioned with respect to the relatively narrow discharge path 30, or straddle the discharge path, so that each intercepts an equal portion of said path. The discharge path may require proper orientation by external means when the device 1 is initially energized. This may be accomplished by rotating the disc 21. When correctly oriented, the current flow between the cathode 4 and the detector electrodes 6 and 7 will be equal, producing equal voltage drops across resistors 16 and 17. This provides a zero output from amplifier 19 and no rotation of the motor 20. Meter 23 thus gives a zero reading, indicative of zero applied acceleration forces in the directions of the arrows $a$ and $b$, as well as zero applied tilt.

Now considering an accelerating force applied to the electron device 1 in the direction shown by the arrow $a$ in FIGURE 2, the orientation of the discharge path will be found to shift towards the electrode 6, shown by path 31 in FIGURE 2, conduction tending to increase at electrode 6 and to decrease at electrode 7. The shift is attributed to a flow of the gas molecules in the same direction as that of the applied accelerating force, as will be explained. A voltage differential occurs between electrodes 6 and 7 developing an output signal from amplifier 19, which rotates the motor accordingly and provides an output reading in meter 23, indicative of the applied accelerating force.

To further explain the operation, it is theorized that the differential conduction to detector electrodes 6 and 7 resulting from the applied acceleration forces is due to thermal effects and convection flow of the molecules in the gaseous material 3. Convection flow is caused by the combined effect of the heating phenomenon occurring at the electron emitting tip of the cathode 4 and a density gradient in the gas 3 produced by the applied accelerating forces. The direction of convection flow is determined by the resultant accelerating forces acting on the device. An applied force produces a density gradient in the direction of the force causing convection flow in closed paths away from the heated region towards the region of low density and return through the cooler and high density region. The convection flow is assumed to, first, influence the position of the cathode sheath, an accumulation of positive ions normally formed in proximity to the cathode which determines the initial direction of the emitted electrons, and second, to influence the direction of the ions in the discharge path. This influence is due to the effect of the physical movement of the gas molecules on the ions of the cathode sheath and the discharge path. Thus, with no accelerating forces present, there is no convection flow and the discharge path is determined simply by the electric field present. The discharge path will thus initially be symmetrical with respect to the detector electrodes. With only a gravitational force present and assuming the electron device to be vertically oriented, convection flow may be seen to be in a direction upward and away from the heated regions and is symmetrical with respect to the detector electrodes. There is no flow component across the discharge path, and hence no shift of the path. With an accelerating force applied in the direction of the arrow $a$, there is produced a transverse component of convection flow, in the same direction as the accelerating force, which shifts the discharge path towards the detector electrode 6. This increases the conduction to electrode 6 and reduces the conduction to electrode 5. The resulting electrode currents increase the voltage drop across the resistor 16 and decrease the voltage drop across resistor 17. The difference voltages between the detector electrodes 6 and 7, being amplified, energize the motor 20, which provides a rotation of the disc 21 in accordance with the magnitude and polarity of this difference voltage.

The resulting rotation of disc 21, in the direction indicated by arrow $e$ produces a flow of the gas molecules in the region of the discharge in a direction from the detector electrode 6 towards the detector electrode 7. This gas flow operates in a direction opposed to the transverse component of the convection flow and tends to shift the discharge path back towards the initial position between the electrodes. The composite effect of the opposing gas flow is to actually stabilize the discharge path in a region slightly biased towards electrode 6. At this point the difference voltage appearing between the detector electrodes 6 and 7 produce a gas flow by disc 21 which counterbalances the transverse component of convection flow by the applied accelerating force. The difference voltages between electrodes 6 and 7 are thus maintained in a linear relationship to the applied accelerating forces in the responsive direction. Accordingly, the rotational speed of the disc, varying as the difference voltages, is linearly related to the applied acceleration forces and through tachometer 23 provides a measure of said forces.

Although the feedback operation has been described with respect to a particular servo component, it is apparent that any conventional servo motor and amplifier may be employed to position the discharge path.

The circuit of FIGURE 1 may be readily employed as a velocimeter by merely counting the number of rotations made by the disc 21, since this provides a convenient integration of the acceleration.

It may be appreciated that if the electron device 1 is inclined in a clockwise direction around the axis X, shown by arrow $c$ in FIGURE 1, a differential conduction to the detector electrodes 6 and 7 will take place in a similar manner as with the accelerating force applied in the above explanation. Gravitational forces provide a convection flow towards detector electrode 6 which biases conduction towards this electrode, the conduction as before being stabilized by the rotation of disc 21.

With an applied accelerating force in the direction indicated by the arrow $b$, in FIGURE 2, or with an inclination around axis X in the direction of arrow $d$, FIGURE 1, a converse effect relative to that previously described is obtained. For this condition, conduction to the detector electrode 7 will predominate, the polarity of the difference voltage between the detector electrodes will be reversed and the disc 21 will be rotated in the direction of arrow $f$.

The circuit of FIGURE 1 is relatively insensitive to force components applied in directions other than the responsive directions indicated by the arrows $a$ and $b$ or to inclinations other than around axis X. Thus, cross modulation is minimized. For example, considering a force parallel to axis X, which as shown in FIGURE 1 is the longitudinal axis of the detector electrodes, any resulting movement of the discharge path will be symmetrical with respect to the detector electrodes 6 and 7. Conduction to these portions will not change and no difference voltage will be effected between the detector electrodes. Similarly, for accelerating forces in a direction perpendicular to the plane of the detector electrodes no differential conduction will result. Thus, it may be seen that the device is sensitive only to forces parallel to the plane of the detector electrodes and orthogonal to the longitudinal axis of said electrodes.

It is noted that the circuit of FIGURE 1 is also useful when modified to a basic configuration in which the feedback function is deleted. Thus, the motor 20 and disc 21 may be omitted from the operation and a voltmeter connected across the output from amplifier 19, the voltmeter being responsive to applied acceleration forces. It may be appreciated that in this modified operation, the output is no longer proportional to the applied acceleration forces but provides an indication of the presence or absence of such forces.

It should be clear that although applicant's devices have been described with reference to specific configurations, the invention is not to be construed as limited thereto. Thus, the plasma medium 3, in some applications, may be in the form of a conducting liquid, e.g., a solution of water and salt. For this embodiment an electrolytic conduction between the cathode and detector electrodes replaces the former gaseous discharge. A small energizing potential would be required, typically 110 volts D.-C. or A.-C. since the liquid is considerably more conductive than the gas.

Although the circuit of FIGURE 1 has been described with relation to electrical detection means, for some applications an alternative photoelectric detection may be utilized. One possible construction may include a pair of photoelectric cells coated on the glass envelope 2, spaced apart in similar fashion to the detector electrodes 6 and 7 so as to normally straddle the glow of the discharge. The cells are energized by a source similar to that shown in the electrical detection circuit, and they provide an output as the illumination provided by the glow is shifted. The circuit operation otherwise is as described in the electrical detection embodiment.

In addition, in certain application, a uniform ring discharge may be employed in lieu of the concentrated discharge, the detector electrodes being suitably spaced. The gas mixture and pressure may be other than indicated so long as a responsive discharge is obtained. The other parameters of the circuit, including the energizing potentials and resistor values, may be varied accordingly.

Further, the electrode structure and the supports therefore may take other forms than illustrated. For example, the anode may be in the form of a ring; or the emissive cathode tip may be positioned below the anode, and the detector electrodes mounted therebetween. Also, ammeters may be inserted in the leads to the detector elements in lieu of the load resistors and voltmeter, a differential current flow rather than a voltage drop providing the output signal.

It is also noted that applicant's invention may also be useful as a gyroscope or angular accelerometer by utilizing the phenomenon of relative movement of the discharge path with respect to detection means in response to applied forces.

The appended claims are intended to be construed as embodying the recited modifications as well as all those falling within the true scope and spirit of the invention.

What I claim as new and desire to secure by Letters Patent of the United States is:

1. An electrical sensing circuit responsive to acceleration forces applied in a predetermined direction comprising an electron device having a cathode electrode and an anode electrode symmetrically displaced therefrom, a sealed envelope filled with a fluid liquid atmosphere enclosing said electrodes, said electrodes being energized so as to cause a flow of ions between said cathode and anode electrodes along a path having a given orientation in the absence of said acceleration forces, said path being shifted from said given orientation by a fluid flow in response to said acceleration forces, a pair of detector elements each providing a response in accordance with the orientation of said path, said detector elements being symmetrically positioned with respect to said given orientation of said path so that the response of each detector element is equal when said path has said given orientation and unequal when said path is shifted from said given orientation, a difference in said responses thereby providing a signal indicative of said acceleration forces.

2. An electrical sensing circuit as in claim 1 further comprising rotatable means for producing a fluid flow in the region of said detector elements, means for applying said signal to said rotatable means for producing a fluid flow proportional to and in a direction opposed to the flow caused by said applied acceleration forces whereby said ion path is stabilized in a second direction, and means for obtaining the rate or rotation of said rotatable means to thereby measure the acceleration provided by said acceleration forces.

3. An electrical sensing circuit as in claim 1 further comprising rotatable means for producing a fluid flow in the region of said detector elements, means for applying said signal to said rotatable means for producing a fluid flow proportional to and in a direction opposed to the flow caused by said applied acceleration forces whereby said ion path is stabilized in a second direction, and means for obtaining the number of rotations of said rotatable means to thereby measure the velocity provided by said acceleration forces.

4. An accelerometer comprising a plasma electron device responsive to acceleration forces applied in a predetermined direction, said device having a cathode electrode with a restricted emissive area and a flat plate anode electrode symmetrically displaced therefrom, said electrodes being enclosed in a hermetically sealed envelope filled with a fluid and being energized to produce a flow of ions between said restricted emissive area and said anode along a path having a given orientation in the absence of said acceleration forces, a pair of elongated detector electrodes mounted within said envelope in a plane parallel to said anode and normally symmetrically positioned with respect to said given path orientation so that conduction to each of said detector electrodes is equal in the absence of said acceleration forces, said path being shifted from said given orientation by a fluid flow in response to said acceleration forces, conduction to said detector electrodes thereby becoming unequal and developing a signal voltage across said detector electrodes, a feedback mechanism including a servo motor and a rotatable disc mechanically coupled thereto, rotation of said disc providing a fluid flow in the region of said detector electrodes, said signal voltage being coupled to said motor to rotate said disc at a rate to produce a fluid flow proportional to and in a direction opposed to the fluid flow caused by said acceleration forces, whereby the orientation of the ion path is stabilized so that said signal is maintained linearly related to the applied acceleration forces.

5. An accelerometer as in claim 4 wherein said fluid is a gas composed of 95% argon and 5% nitrogen at a pressure of approximately 200 millimeters of mercury.

6. An accelerometer as in claim 4 wherein said fluid is a conducting liquid.

7. An accelerometer comprising a plasma electron device responsive to acceleration forces applied in a predetermined direction, said device comprising an elongated cathode electrode having emission restricted to the tip thereof, a flat plate anode electrode mounted in a plane orthogonal to the longitudinal axis of said cathode, said anode having a central aperture through which the emissive tip of the cathode projects, a pair of elongated detector electrodes mounted in a plane parallel to the plane of the anode, cathode, anode and detector, said electrodes being hermetically sealed in a glass envelope filled with a gas, a rotatable mechanical means mounted within said envelope, said anode and cathode being energized to produce an ion flow between said emissive tip and a concentrated area of said anode along a narrow path, said detector electrodes normally being mounted to straddle said path, said path being shifted in the presence of said acceleration forces thereby producing a signal voltage across said detector electrodes, said signal voltage being coupled to rotate said rotatable means to cause a flow of gas molecules in a direction to oppose the shift of the path, whereby said signal voltage is maintained linearly related to said acceleration forces.

8. An accelerometer as in claim 7 wherein said gas is a mixture composed of 95% argon and 5% nitrogen at a pressure of approximately 200 millimeters of mercury.

References Cited in the file of this patent

UNITED STATES PATENTS

| | | |
|---|---|---|
| 1,318,196 | Case | Oct. 7, 1919 |
| 2,455,394 | Webber | Dec. 7, 1948 |
| 2,457,620 | Abraham | Dec. 28, 1948 |
| 2,718,610 | Krawinkel | Sept. 20, 1955 |